United States Patent [19]

Murch

[11] 3,920,616
[45] Nov. 18, 1975

[54] ALKOXY DERIVATIVES OF HEXACHLOROPHOSPHONITRILE CYCLIC TRIMER

[75] Inventor: Robert M. Murch, Ashton, Md.

[73] Assignee: The United States of America as represented by the Secretary of the Navy, Washington, D.C.

[22] Filed: June 19, 1974

[21] Appl. No.: 480,911

[52] U.S. Cl. ...... 260/75 T; 260/45.9 NP; 260/75 P; 260/75 UA; 260/DIG. 24
[51] Int. Cl.² ......................................... C08G 63/52
[58] Field of Search .... 260/45.9 NP, DIG. 24, 75 P, 260/75 T, 75 UA

[56] References Cited
UNITED STATES PATENTS

| | | | |
|---|---|---|---|
| 2,681,295 | 6/1954 | Hamalainen | 260/DIG. 24 X |
| 3,131,207 | 4/1964 | Ratz | 260/DIG. 24 X |
| 3,415,789 | 12/1968 | Coover et al. | 260/75 P X |
| 3,442,986 | 5/1969 | Mole et al. | 260/75 P X |
| 3,711,542 | 1/1973 | Hook et al. | 260/45.9 N P X |

FOREIGN PATENTS OR APPLICATIONS 1,375,029   10/1964   France

OTHER PUBLICATIONS

Chemical Abstracts, Vol. 62: 14,896 (1965).

Primary Examiner—Donald E. Czaja
Assistant Examiner—W. C. Danison, Jr.
Attorney, Agent, or Firm—R. S. Sciascia; Arthur L. Branning

[57] ABSTRACT

Enhancing the fire retardancy of general purpose polyester resins by admixing alkoxy derivatives of hexachlorophosphonitrile cyclic trimer with the resins before they are cured.

11 Claims, No Drawings

ALKOXY DERIVATIVES OF HEXACHLOROPHOSPHONITRILE CYCLIC TRIMER

BACKGROUND OF THE INVENTION

General purpose polyester resins can be used for most types of molding and laminating. By polyester is meant the polycondensation product of dicarboxylic acids with dihydroxy alcohols in contradistinction to materials known as alkyds. These polyester compounds may be modified by mono-carboxylic acids, monohydroxy alcohols and small amounts of polycarboxylic acids or polyhydroxy alcohols. Such compounds have a wide range of properties and a particular resin may have properties that may make it suitable for one purpose but unsuitable for another. For example, high viscosity resins are useful in vertical layup, where low viscosity resins, however, would be required when rapid penetration was desirable.

The wide range of properties possible with polyester resins leads to a variety of applications. They can be used as the primary polymer in fiber reinforced laminates and as the binder in composites containing a variety of inert fillers. Castings, potting compounds, cements, sealing and patching compounds, rigid and flexable coatings and adhesives can be based on polyester resins. As distinct from saturated polyesters, the resins contain olefins which produce the highly cross-linked structure generally known as a thermoset polymer.

While the uses of general purpose polyester resins continue to steadily grow, such resins suffer from the drawback that due to their high hydrogen and carbon content they continue to burn fairly readily once ignited. Since much concern has been generated by consumers to reduce the flammability of products such as flammable fabrics, manufacturers have had to find ways to reduce the flammability of polyesters and polyester resins.

Other polymers have had combustion problems also, e.g. polyurethanes. Fire retardancy of these polymers has been enhanced by additives. An example of this teaching is found in U.S. Pat. No. 3,450,675 filed June 14, 1965 by Ashworth, et al. Due to chemical differences in the combustion of these other polymers and the differences in the charring temperature of these other polymers, little information can be learned from enhancing the fire retardancy of these other polymers.

The flammability of polyester resins can be reduced in several ways. These include chemical modification of one or more of the resin components, addition of organic fire retardants or addition of inorganic fillers and fire retardants.

A common chemical modification is replacing the diacid with a diacid containing halogen. Tetrachlorophthalic and tetrabromophthalic anhydrides are commonly used. One of the most widely used anhydrides is chlorendic anhydride, made by the Diels-Alder addition of hexachlorocyclopentadiene to maleic acid.

Other common polymer modification include post bromination of the resin and the use of brominated diols. Halogenated styrene has been used and there are numerous known examples of the attachment of phosphorus-containing moieties to the diols, diacids or cross-linking olefins.

Two main types of organic compounds are commonly used as soluble, non-reactive additives. Halogen-containing aliphatic or aromatic compounds are commonly cited. Phosphorus compounds such as triethylphosphate are also well known in the art. Currently the combination of the two, i.e., tris-$\beta$- chloroethylphosphate or 2, 3-dibromopropyl phosphate have been widely used. In all of these cases the amount of additive is limited by possible plasticizing effects. Even small amounts of organometallics, examples being ferrocene or ferrocene derivatives have been recommended as desirable additives.

A number of inorganic additives are commonly added. Of course, glass fibers or cloth are used to increase the strength of the resin, but this may or may not help the flammability. The use of inert fillers such as calcium carbonate, magnesium oxide, etc., usually help the flammability characteristics in a minor way. The addition of hydrated salts and oxides, aluminatrihydrate being the most widely used, are effective by acting as a heat sink that slows down the energy transfer to the polymer. Antimony oxide is used, usually in conjunction with halogens, the latter may be incorporated as part of the resin or as a separate additive. Another commonly used inorganic additive is zinc borate.

Thus, while the techniques used to reduce the flammability of polyester resins do so to some extent, all suffer from some drawback.

SUMMARY OF THE INVENTION

It is therefore an object of the present invention to provide general purpose polyester resins having low flammability characteristics.

Another object of the invention is to provide additives which when added to general purpose polyester resins will enhance the fire retardancy of those resins.

Another object of the invention is to provide a method for enhancing the fire retardancy of polyester resins.

And another object of the invention is to provide fire retardant additives for general purpose polyester resins which are cheap and readily available.

Yet another object of the invention is to provide fire retardant additives for general purpose polyester resins, which give minimum interference with the properties of the resins.

And yet another object of the invention is to provide a general purpose polyester resin having a low flammability without having a reduced outside durability.

These and other objects are achieved by reacting hexachlorophosphonitrile cyclic trimer $(PNCl_2)_3$ with an alcohol thereby producing alkoxy compounds capable of enhancing the fire retardancy of polyester resins.

DETAILED DESCRIPTION

In accordance with the novel aspects of the invention, general purpose polyester resins are rendered fire retardant by adding an additive. By "fire retardant" is meant that the resin is resistant to flame after the igniting flame has been removed. In other words the fire retardant polyester resins will not support combustion by itself. When in contact with an open flame, however, it may become charred.

Generally, polyesters are formed by the reaction of a dibasic acid with a polyhydric alcohol, such as, ethylene glycol. If either the acid or the alcohol is unsaturated, an unsaturated polyester is obtained that is capable of subsequent cross-linking either directly to similar unsaturated double bonds in adjacent polyester chains of the same structure or through an unsaturated double bond in a monomer such as styrene. An example of the latter is poly (propylene maleate/phthalate) in styrene which has long been used as a guide to compare with other more complex polyester resins. It is produced by reacting 2 moles of propylene glycol, 1 mole of phthalic anhydride, 1 mole of maleic anhydride, hydroquinone equal to 0.2% by volume of the final solution, and monomer styrene 35% by volume of the final solution. In the example hereinafter presented poly (propylene maleate/phthalate) in styrene was used to test the ability of the additive to render polyester resins fire retardant.

The fire retardance enhancing additives of the invention are best produced by reacting in a $(PNCl_2)_3$ to alcohol mole ratio of 1:6 hexachlorophosphonitrile cyclic trimer $(PNCl_2)_3$ with an alcohol in benzene in an amount at least sufficient to dissolve the reactants and then by adding pyridine in a mole ratio of 7:3. The product is isolated by filtering the pyridine hydrochloride and evaporating the solvent. This process follows the basic principles disclosed in Goldschmitt and Diskon. *Polymeric Phosphonitrilic Esters: A New Type of Inorganic – Organic Plastics.* In J.J. polymer Science, 3 pp 481–5, 1949 and in U.S. Pat. No. 2,586,312, filed Feb. 4, 1948 by Diskon et al.

Alcohols found useful are β-chloroethanol, 3,3,3-trichloropropanol 1,3-dichloro-2-propanol, 2,3-dibromopropanol, methanol, ethanol and 2,2,2-trichloroethanol. It is expected that a good many other alcohols will yield similar results.

The fire retardancy of a general purpose polyester is increased with the alkoxy derivatives of the present invention by admixing an alkoxy derivative with one of the previous esters in an amount from about 5 to about 20 weight percent of the total mixture. Inclusion of the additive in made after the polyester is prepared, but before it is cured.

As stated previously, polyester resins may be cross-linked either directly or through an unsaturated monomer. When cross-linked quite often a catalyst is used. Among the catalysts useful for such purposes are the peroxides. Some decompose at high temperatures, therefore, the choice of an appropriate catalyst depends on the intended molding or curing temperature. Benzoyl peroxide starts to decompose at 50°C and is therefore used for resins which are cured at high temperatures. Methylethyl ketone peroxide is used at lower temperatures especially with a cobalt accelerator such as cobalt naphthenate. Table I taken from *Polyesters and Their Applications*, Bjorksten Research Laboratories, Inc. Reinhold Publishing Corp., New York, 1956, p 49 lists commonly used peroxide catalysts.

TABLE I

| Trade Name | Composition | Physical form | Peroxide assay % | Supplier* |
|---|---|---|---|---|
| — | Benzoyl peroxide | granules | 96 | 2 |
| — | Benzoyl peroxide | fine granules | 96 | 2 |
| — | Benzoyl peroxide purified | fine crystals | 96 | 2 |
| LUCIDOL | Benzoyl peroxide | fine crystals | 96 | 1 |
| LUPERCO ATC | Benzoyl peroxide compounded with tricresyl phosphate | thick paste | 50 | 1 |
| CADOX BTP | Benzoyl peroxide compounded with tricresyl phosphate | thick paste | 50 | 2 |
| LUPERCO CDB | 2,4-Dichlorobenzoyl peroxide compounded with dibutyl phthalate | thick paste | 50 | 1 |
| LUPERSOL DDM | Methylethyl ketone peroxide in dimethyl phthalate | liquid | 60 | 1 |
| CADON MDP | Methylethyl ketone peroxide in dimethyl phthalate | liquid | 60 | 2 |
| — | Cyclohexanone peroxide (mixed ketone peroxides) | granules | 96 | 1 |
| LUPERCO JDB | Cyclohexanone peroxide compounded with dibutyl phthalate | thick paste | 50 | 1 |
| — | Cumene hydroperoxide | liquid | 73 (as hydroperoxide) | 3 |

*Supplier:
1 Lucidol Div., Wallace and Tiernan, Inc., Buffalo, N.Y.
2 McKesson and Robbins, Inc., Chem. Div., N.Y. (distributors for Cadet Chem. Corp., Buffalo, N.Y.)
3 Hercules Powder Co., Nav. Stores Dept., Wilmington, Del.

Other peroxide catalysts mentioned in the polyester patent literature are bis(para-bromobenzoyl) peroxide, bis(phthalyl) peroxide, bis(parachlorobenzoyl) peroxide, bis(succunyl) peroxide, acetylbenzoyl peroxide, bis(chloroacetyl) peroxide, bis(acetyl) peroxide, tertiary-butyo perbenzoate, tertiary-butyl hydroperoxide, bis(dichlorobenzoyl) peroxide, oxonides such as diispropylene oxonide and di-isobytylent oxonide, peracetic acid, benzoyl peracetate, and peroxy-carbonates such as ethyl peroxy-dicarbonate.

Accelerators other than cobalt naphthenate may be used as well. Among these are the vanadium accelerators and dimethyl-p-toluidine. Other catalysts such as dimethylaniline may be used as well. When using these accelerators and catalysts to promote cross-linking the polyester resin, it may be beneficial to heat the resin. The temperature at which to heat the resin is dependent upon the curing system being employed and is well within the skill of the art.

In order to more fully illustrate the invention the following examples are presented. The purpose of the examples is to illustrate the fire retardancy characteristics obtained by adding the alkoxy derivatives of the invention to a general purpose polyester resins. Therefore, the use herein of the general purpose polyester resin is meant to be illustrative and not a limitation as to the scope of the invention.

EXAMPLE I

Hexachlorophosphonitrile cyclic trimer, 24.8g, was dissolved in 150 ml of benzene. Then a solution of β-chloroethanol, 48.3g, and pyridine, 47.4g, was added slowly. The formation of pyridine hydrochloride started when the addition started and continued during a post addition heating period of 60 hrs. The reaction mixture was cooled, filtered and the filtrate washed with methylene chloride. The product, obtained by evaporating the solvent, was a viscous liquid. Heating above 120°C caused decomposition and it was not volatile up to this temperature at 0.1mm Hg.

EXAMPLE II

The technique described in Example I was used with 2,2,2-trichloroethanol, 89.7g. The product, isolated by filtering the pyridine hydrochloride, evaporating the solvent and unreacted starting materials, was a viscous tan liquid.

EXAMPLE III

The technique described in Example I was used with 2,3-dibromo-propanol, 78.6g, to produce a viscous brown liquid that was not volatile up to 120°C at 0.1mm Hg. The product, 58.9g, was obtained in a 72% yields and had an infrared spectra consistent with the presumed structure.

EXAMPLE IV

A resin was prepared containing 90 parts of a general purpose resin (GR-941 - Marco Chemical Division) and 10 parts of the additive described in Example I. The resin was cured by adding 0.02 parts of cobalt naphthenate and 0.2 parts of a methylethylketone peroxide and then holding at 60°C for 6 hrs. The cured resin had a Barcol hardness of 44 and an oxygen index of 0.235.

EXAMPLE V

Using the technique described in Example IV, and the additive described in Example II, a resin was prepared with a Barcol hardness 46 and an oxygen index of 0.260.

EXAMPLE VI

Using the technique described in Example IV and the additive described in Example III produced a resin with a Barcol hardness of 45 and an oxygen index of 0.275.

Examples I–III, illustrates the production of three different alkoxy derivatives by reacting hexachlorophosphonitrile cyclic trimer with various alcohols. Examples IV–VI, are illustrative of the use of alkoxy derivatives used as fire retardant additives to the polyester resins.

In the examples the oxygen index was obtained by using the method disclosed under ASTMD2863–70. By "Oxygen Index" is meant the minimum oxygen concentration, expressed in volume percent, in a mixture of oxygen and nitrogen that will just support combustion of a material under the conditions of the method. Accordingly, a material having a high oxygen index requires more oxygen to support combustion, and is therefore more fire retardant than one having a low oxygen index. In each of the examples the additive enhanced the fire retardation capabilities of the polyester resin.

The polyester resin used in the examples has an oxygen index of 0.18. It is apparent that the use of the additive of the invention significantly increases the fire retardancy of the resin.

Obviously many modifications and variations of the present invention are possible in light of the above teachings. It is therefore to be understood that within the scope of the appended claims the invention may be practiced other wise than as specifically described.

What is claimed and desired to be secured by Letters Patent of the United States is:

1. A method for enhancing the fire retardancy characteristics of unsaturated general purpose polyester resins, which comprises based on total weight admixing from about 5 to 20% of an alkoxy derivative produced by the reaction of hexachlorophosphonitrile cyclic trimer and an alcohol selected from the group consisting of β-chloroethanol, 3,3,3-trichloropropanol, 1,3-dichloro-2-propanol, 2,3-dibromopropanol, methanol, ethanol, and 2,2,2-trichloroethanol with said unsaturated polyester resin; and curing said unsaturated polyester resin.

2. The method of claim 1 further including the step of adding a peroxide catalyst, thereby catalyzing said unsaturated polyester resin cure.

3. The method of claim 2 further including the step of adding heat to said unsaturated polyester resin cure.

4. A polymer having enhanced fire retardancy properties comprising an unsaturated general purpose polyester resin containing an alkoxy derivative produced from the reaction of an alcohol selected from the group consisting of β-chloroethanol, 3,3,3-trichloropropanol, 1,3-dichloro-2-propanol, 2,3-dibromopropanol, methanol, ethanol, and 2,2,2-trichloroethanol with hexachlorophosphonitrile cyclic trimer, wherein said alkoxy derivative is present in a quantity ranging from about 5 to 20% by weight of said polyester.

5. The method of claim 2 further including the step of adding an accelerator selected from the group consisting of cobalt naphthenate, dimethyl-p-toluidine, and vanadium accelerators.

6. The method of claim 2 wherein said alcohol is selected from the group consisting of methanol and ethanol.

7. The method of claim 2 wherein said alcohol is selected from the group consisting of β-chloroethanol and 2,2,2-trichloroethanol.

8. The method of claim 2 wherein said alcohol is selected from the group consisting of 3,3,3-trichloropropanol, 1,3-dichloro-2-propanol, and 2,3-dibromopropanol.

9. The polymer of claim 4 wherein said alcohol is selected from the group consisting of methanol and ethanol.

10. The polymer of claim 4 wherein said alcohol is selected from the group consisting of β-chloroethanol and 2,2,2-trichloroethanol.

11. The polymer of claim 4 wherein said alcohol is selected from the group consisting of 3,3,3-trichloropropanol, 1,0-dichloro-2-propanol, and 2,3-dibromopropanol.

* * * * *